US012698130B2

(12) United States Patent
Chen

(10) Patent No.: US 12,698,130 B2
(45) Date of Patent: Aug. 4, 2026

(54) EXPANDABLE TOOLBOX

(71) Applicant: Pei-Lin Chen, Taichung City (TW)

(72) Inventor: Pei-Lin Chen, Taichung City (TW)

( * ) Notice: Subject to any disclaimer, the term of this patent is extended or adjusted under 35 U.S.C. 154(b) by 16 days.

(21) Appl. No.: 18/804,606

(22) Filed: Aug. 14, 2024

(65) Prior Publication Data

US 2026/0048900 A1 Feb. 19, 2026

(51) Int. Cl.

| | |
|---|---|
| ***B25H 5/00*** | (2006.01) |
| ***B25H 3/02*** | (2006.01) |
| ***B65D 21/08*** | (2006.01) |
| ***B65D 25/28*** | (2006.01) |
| ***B65D 77/04*** | (2006.01) |

(52) U.S. Cl.

CPC ........... *B65D 21/086* (2013.01); *B25H 3/023* (2013.01); *B65D 25/28* (2013.01); *B65D 77/046* (2013.01); *B25H 3/027* (2013.01)

(58) Field of Classification Search

CPC ... A45C 7/0031; A45C 7/0063; A45C 7/0072; A45C 11/20; B25H 3/02; B25H 3/003; B25H 3/06; B25H 3/006; B25H 3/023; B25H 3/025; B25H 3/027; B25H 3/028; B25H 1/12; B25H 3/00; B25H 3/021; B65D 21/086; B65D 21/083; B65D 21/08; B65D 25/28; B65D 77/046; B65D 88/005; B65D 25/02; Y10S 312/902

USPC .... 206/349, 468, 279, 373, 234; 220/8, 534, 220/551, 4.22, 4.23, 4.03, 23.83

See application file for complete search history.

(56) References Cited

U.S. PATENT DOCUMENTS

| | | | | | |
|---|---|---|---|---|---|
| 2,907,487 | A * | 10/1959 | Harrington | A47B 88/90 | 220/8 |
| 2,953,244 | A * | 9/1960 | Phillips | A47F 5/10 | 220/8 |
| 4,768,651 | A * | 9/1988 | Lanius | A01K 97/06 | 206/315.11 |
| 4,938,355 | A * | 7/1990 | Rocco | B44D 3/121 | 312/902 |
| 5,114,007 | A * | 5/1992 | Chen | B25H 3/028 | 312/902 |
| 5,826,719 | A * | 10/1998 | Chen | B25H 3/028 | 312/902 |
| 6,105,767 | A * | 8/2000 | Vasudeva | B25H 3/023 | 206/349 |
| 6,116,447 | A * | 9/2000 | Daoud | H02B 1/44 | 220/4.03 |

(Continued)

*Primary Examiner* — Gideon R Weinerth

(74) *Attorney, Agent, or Firm* — MUNCY, GEISSLER, OLDS & LOWE, P.C.

(57) ABSTRACT

An expandable toolbox includes a first box body, a second box body, a third box body, and a fastener. The first box body is pivotally disposed on the second box body, which pivots between a closed and an expanded position relative to the first box body. At the expanded position, the second and the first box body are arranged in an open and flat shape. The second box body has a first sliding part disposed on two sides. The third box body has a second sliding part slidably disposed on the first sliding part, so that the third box body slides between a retracted and an expanded position relative to the second box body. The fastener engaged with the first box body and the third box body, achieving a closed status of the toolbox. The present invention realizes the expansion and retraction of multilayer toolboxes, providing a flexible storage space.

10 Claims, 8 Drawing Sheets

(56) References Cited

U.S. PATENT DOCUMENTS

| | | | | |
|---|---|---|---|---|
| 7,325,682 | B2 * | 2/2008 | Seymour | B25H 3/003<br>206/754 |
| 7,681,731 | B1 * | 3/2010 | Chern | B25H 3/027<br>208/349 |
| 12,014,873 | B2 * | 6/2024 | Wang | H01G 11/78 |
| 2004/0188292 | A1 * | 9/2004 | O'Hair | A45C 7/0031<br>206/349 |
| 2010/0122983 | A1 * | 5/2010 | Steele | B25H 3/003<br>220/4.03 |
| 2014/0102928 | A1 * | 4/2014 | Sabbag | B25H 3/028<br>206/372 |
| 2020/0140150 | A1 * | 5/2020 | Giannopoulos | B65D 77/046 |

* cited by examiner

EXPANDABLE TOOLBOX

BACKGROUND OF THE INVENTION

1. Field of the Invention

The present invention relates to toolboxes, and more particularly, to an expandable toolbox.

2. Description of the Related Art

A conventional toolbox is typically formed of two hinged shells, each providing only one single space for tools storage. Such configuration suffers from disadvantages such as limited storage space, inability to flexible size adjustment, restricted usage scenarios, and low internal space utilization.

Therefore, to improve the issues above, an expandable toolbox is invented.

SUMMARY OF THE INVENTION

To improve the issues above, the present invention discloses an expandable toolbox, which ingeniously utilizes a three-tier box structure. Through the configuration where the second box body is allowed to slide with respect to the third box body, the third box can is able to be extended and pulled into an expanded position, effectively increasing the storage space of the toolbox.

For achieving the aforementioned objectives, an expandable toolbox in accordance with an embodiment of the present invention is provided, comprising:

- a first box body comprising a first pivot part and a first engagement part arranged away from the first pivot part;
- a second box body comprising a second pivot part pivotally disposed on the first pivot part along an axis, so that the second box body pivots between a closed position and an expanded position with respect to the first box body; when the second box body is at the expanded position, the second box body and the first box body are arranged in an open and flat shape; the second box body further comprising a first sliding part disposed on two sides thereof;
- a third box body comprising a second engagement part and a second sliding part, the second sliding part slidably disposed on the first sliding part, so that the third box body slides between a retracted position and an expanded position with respect to the second box body; and
- a fastener engaged with the first engagement part and the second engagement part, such that the toolbox is in a closed status.

With such configuration, the toolbox of the present invention is formed of three box bodies. Through the sliding relationship between the second box body and the third box body, the third box body is allowed to be pulled to the expanded position, increasing the storage space of the toolbox, improving the utility and utilization flexibility of the toolbox.

DETAILED DESCRIPTION OF THE INVENTION

Figure 1:
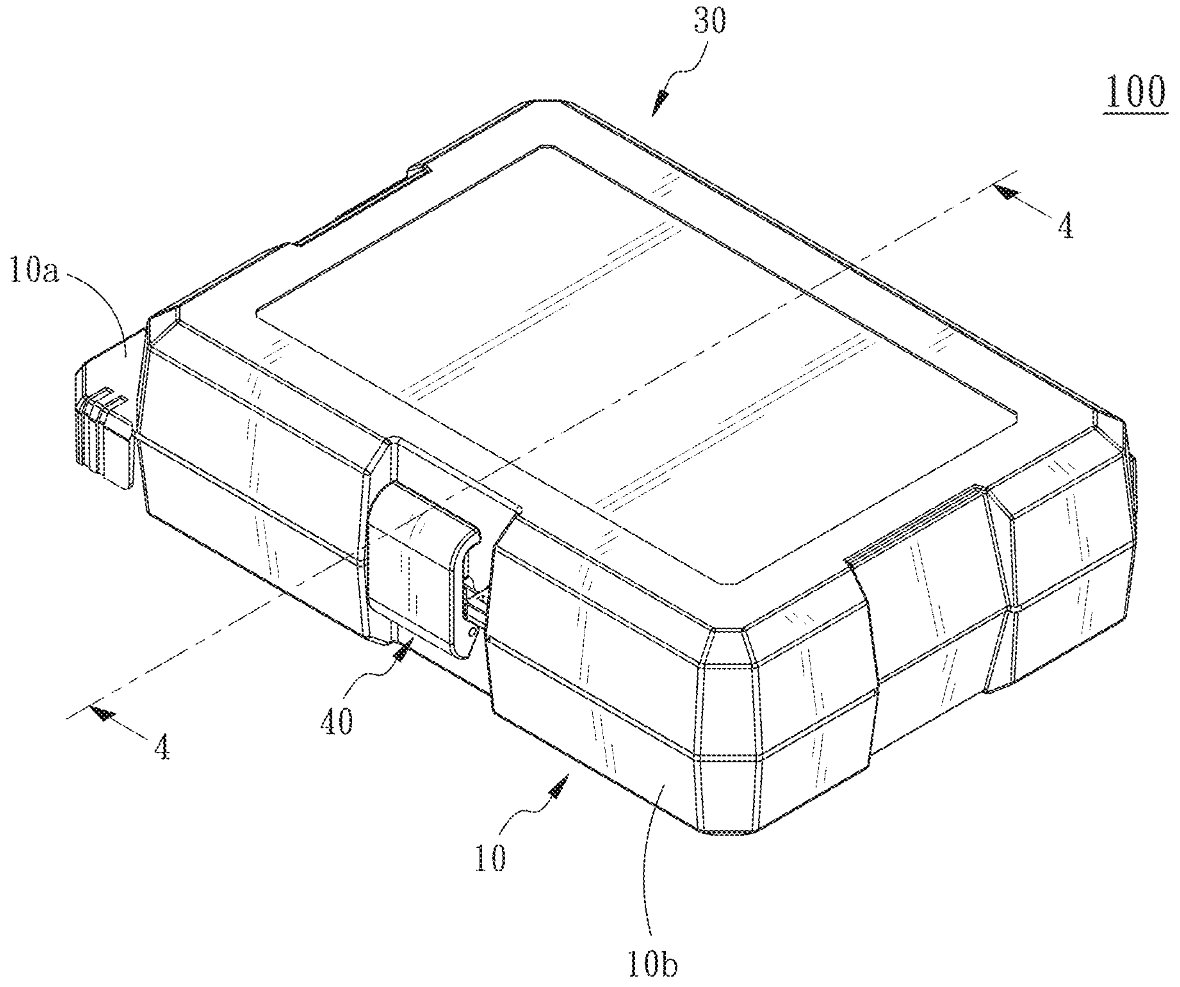
FIG. 1 is a perspective view of the expandable toolbox in accordance with an embodiment of the present invention, illustrating the toolbox in the closed status.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 8, the present invention discloses an expandable toolbox 100, comprising a first box body 10, a second box body 20, a third box body 30, and a fastener 40.

The first box body is formed in a rectangular shape. The first body 10 comprises a first pivot part 11 and a first engagement part 12 arranged away from the first pivot part 11. The first pivot part 11 and the first engagement part 12 are disposed on two opposites sides of the first box body 10, such as, for example but not limited to, the two long sides of the first box body 10. Also, the first box body 10 comprises a first placement face 13 and a first height 14. The first placement face 13 is allowed to be provided with grooves, engagement slots, or positioning parts for tools to be placed therein (not shown).

Figure 2:
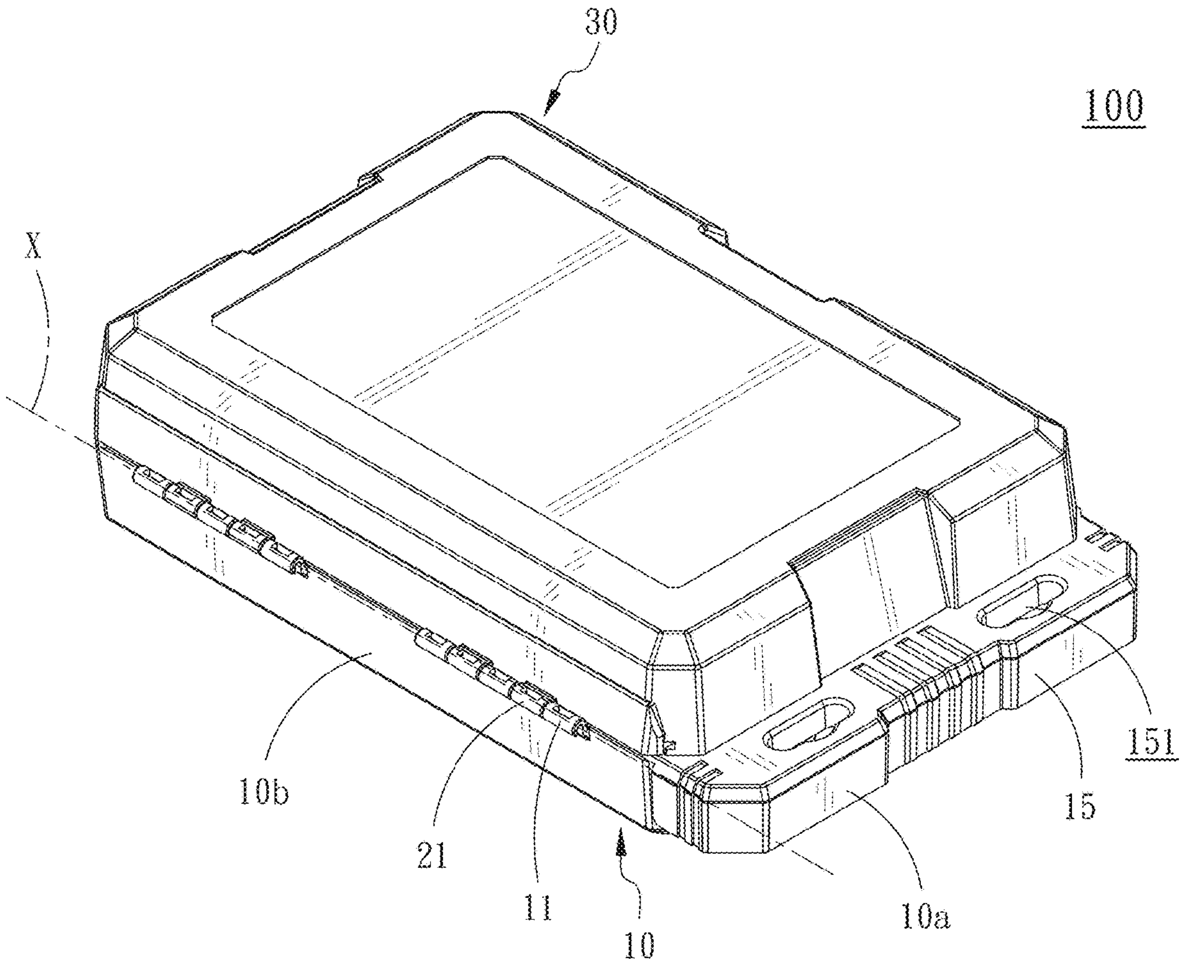
FIG. 2 is another perspective view of the expandable toolbox in accordance with an embodiment of the present invention.

In the embodiment, the first box body 10 comprises an inner casing **10*a* and an outer casing 10*b* that are sleeved or combined together. The first placement face 13 is disposed on the inner casing 10*a*. The first pivot part 11 and the first engagement part 12 are disposed on the outer casing 10*b*. Also, as shown by FIG. 2, the inner casing 10*a* comprises a handle 15 disposed on one side thereof, by which the toolbox 100 is gripped by the user, and the handle 15 comprises a hanger bore 151, by which the toolbox 100** is hung up.

Figure 4:
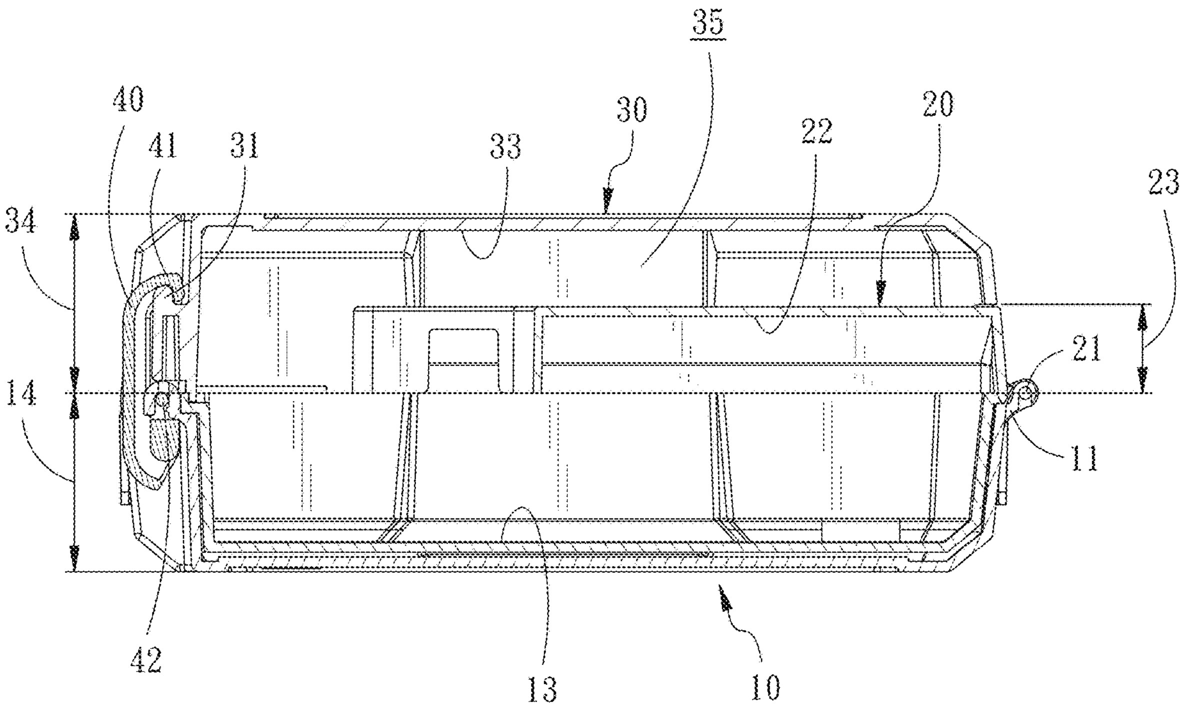
FIG. 4 is a cross-sectional view taken along line 4-4 in FIG. 1.
Figure 5:
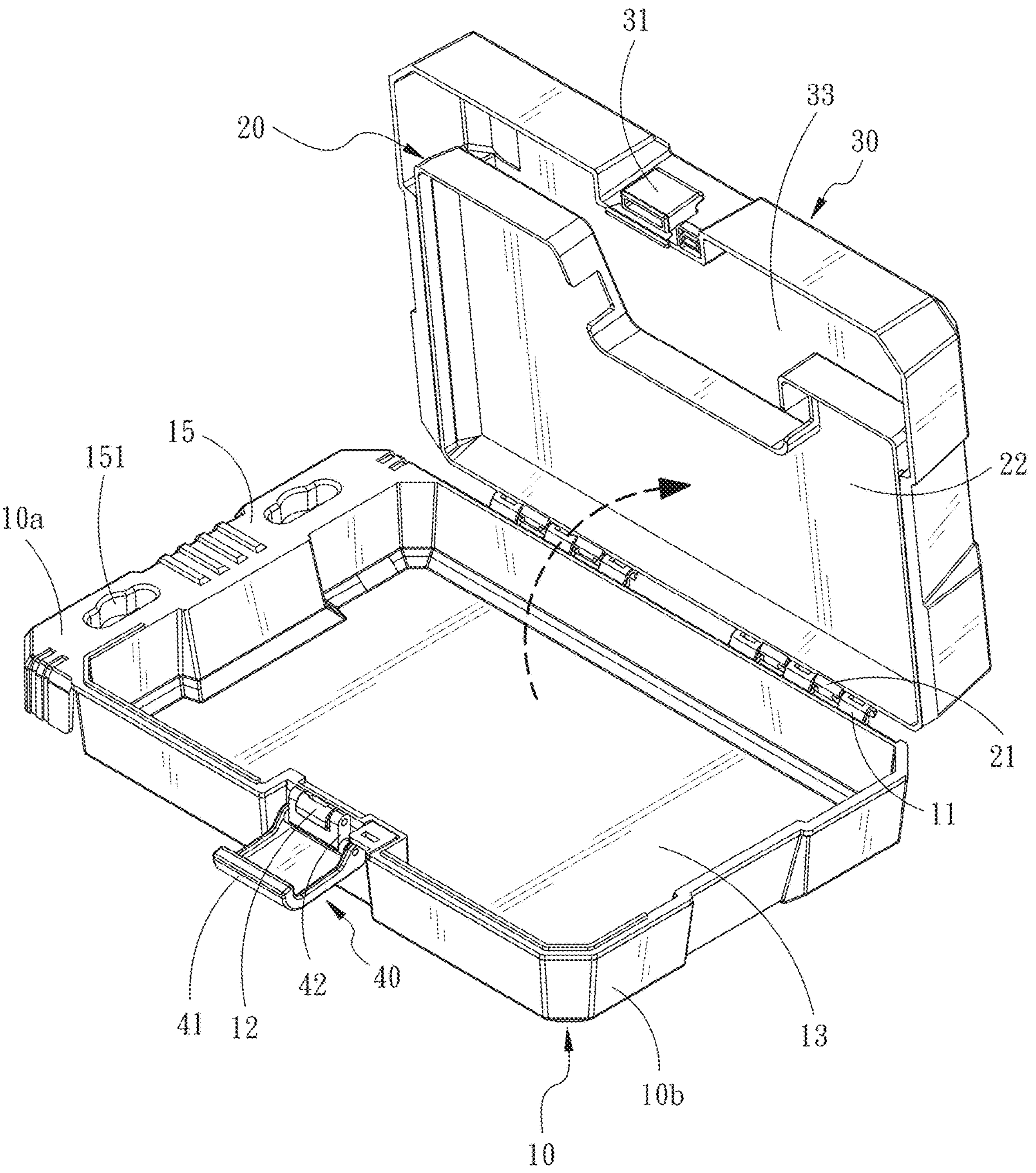
FIG. 5 is a sectional view of the operation status of the expandable toolbox, illustrating the second box body at the expanded position and the third box body remained at the retracted position.

The second box body 20 is formed in a rectangular shape and has a size smaller than the size of the first box body 10. The second box body 20 comprises a second pivot part 21 arranged on one side thereof and pivotally disposed on the first pivot part 11 along an axis X, such that the second box body 20 is able to pivot between a closed position and an expanded position with respect to the first box body 10. The first pivot part 11 and the second pivot part 21 are mutually coordinated hinge structures. Accordingly, referring to FIG. 6, when the second box body 20 is at the expanded position, the second box body 20 and the first box body 10 are arranged in an open and flat shape. Referring to FIG. 4, when the second box body 20 is at the closed position, the second box body 20 overlaps with the first box body 10.

In the embodiment, the second box body 20 comprises a second placement face 22 and a second height 23. The second placement face 22 is allowed to be provided with grooves, engagement slots, or positioning parts for tools to be placed therein (not shown). The second box body 20 comprises a first sliding part 24 disposed on the two shorts sides thereof, wherein the first sliding part 24 includes two sliding blocks formed in a long shape.

The third box body 30 is formed in a rectangular shape and has a size similar to the size of the first box body 10. The third box body 30 comprises a second engagement part 31 and a second sliding part 32. The second sliding part 32 is slidably disposed on the first sliding part 24, so that the third box body 30 is able to slide between a retracted position and an expanded position with respect to the second box body 20. In the embodiment, the second sliding part 32 includes two sliding grooves formed in a long shape. The two sliding grooves are disposed on two opposite inner sides of the third box body 30 corresponding to the aforementioned two sliding blocks.

Figure 6:
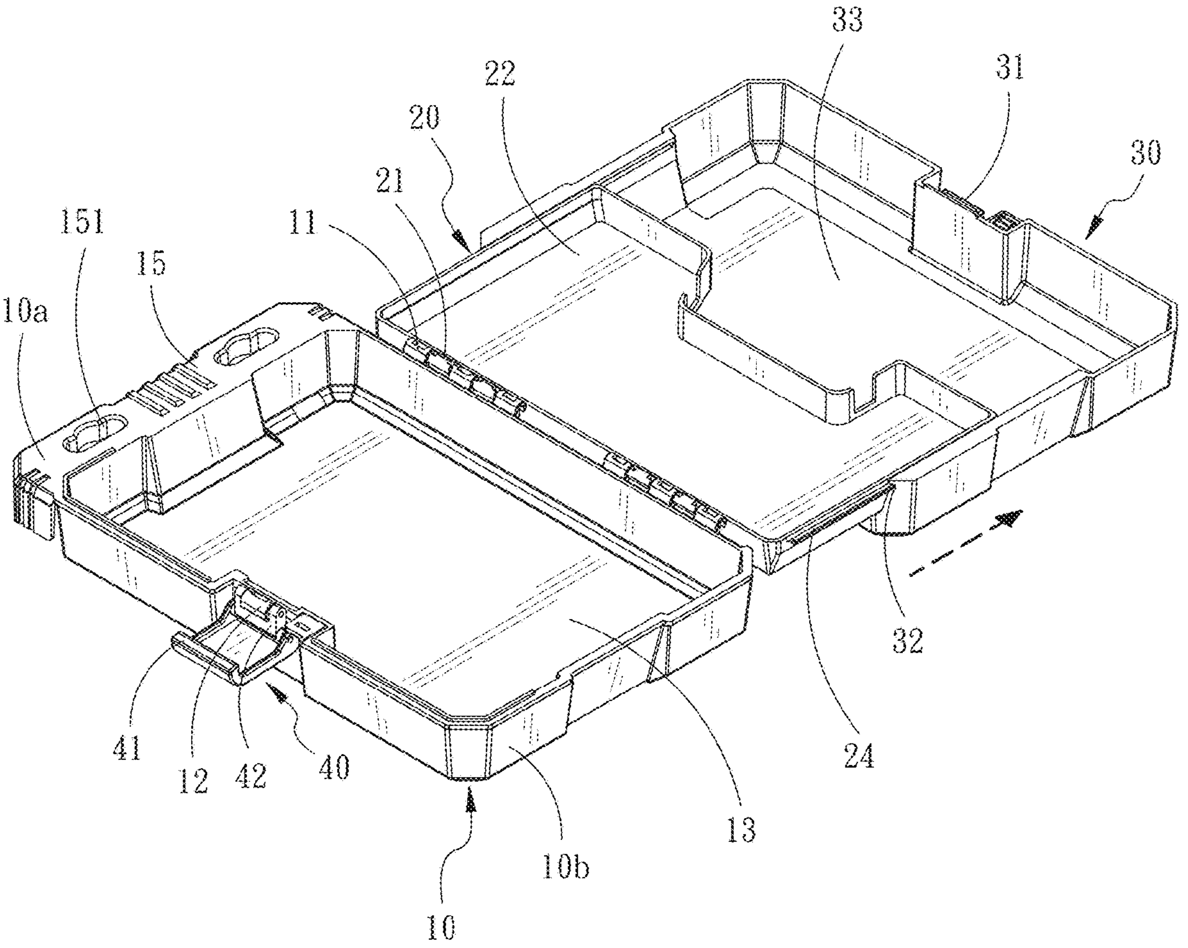
FIG. 6 is a schematic view of the opened expandable toolbox, illustrating the third box body at the expanded position.
Figure 8:
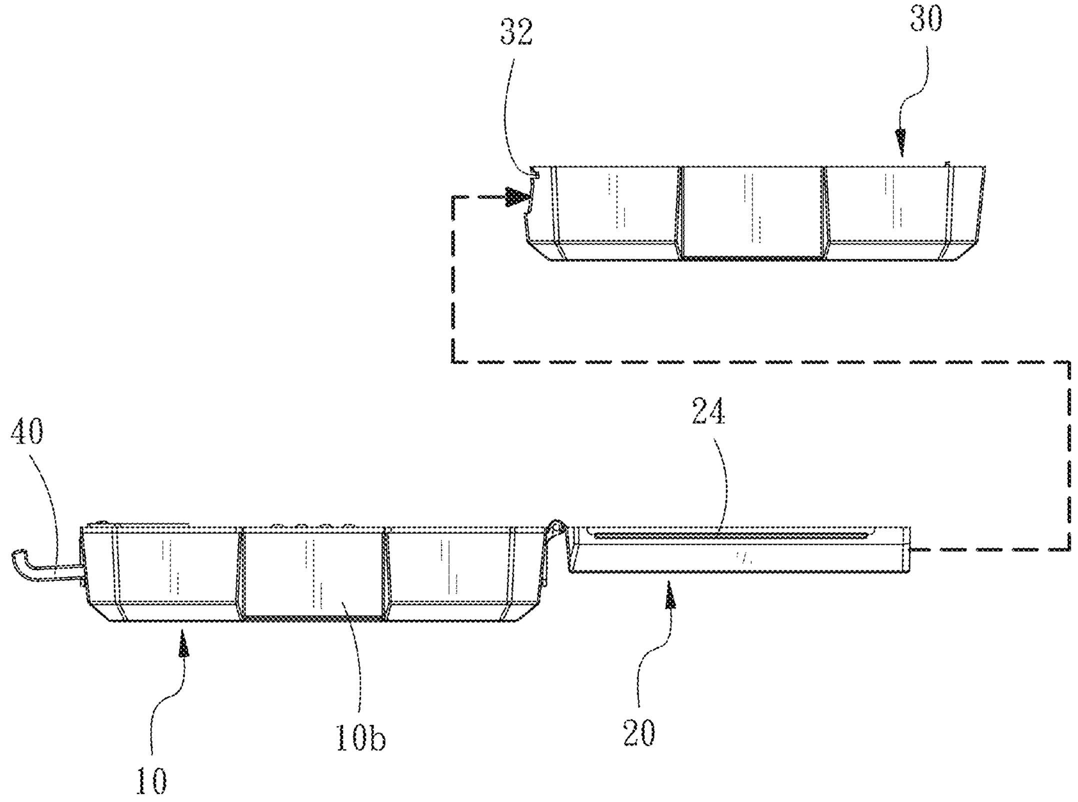
FIG. 8 is a side view of the expandable toolbox in accordance with another embodiment of the present invention, illustrating the third box body being completely pulled out with respect to the second box body.

The third box body 30 further comprises a third placement face 33 and provided with grooves, engagement slots, or positioning parts for tools to be placed therein (not shown). Also, the third placement face 33 is not on the same plane with the second placement face 22. Referring to FIG. 6, when the third box body 30 is at the expanded position, the third box body 30 is slidably pulled out along a direction perpendicular to the axis X with respect to the second box body 20. Also, the second placement face 22 of the second box body 20 is partially overlapped with the third placement face 33 of the third box body 30. In another embodiment, the third box body 30 is allowed to be completely pulled out with respect to the second box body 20 and detached from the second box body 20 (as shown by FIG. 8). In addition, at the aforementioned closed position and the retracted position, both the second placement face 22 of the second box body 20 and the third placement face 33 of the third box body 30 are arranged to face the first placement face 13 of the first box body 10, as shown by FIG. 4.

Further, the third box body 30 has a third height 34. The first height 14 of the first box body 10 is identical to the third height 34 of the third box body 30, and the second height 23 of the second box body 20 is less than the third height 34, such that an inner space 35 is formed between the second box body 20 and the third box body 30. The inner space 35 improves the flexibility for tools to be placed on the third placement face 33.

The fastener 40 is engaged with the first engagement part 12 of the first box body 10 and the second engagement part 31 of the third box body 30, so that the toolbox 100 enters the closed status, as shown by FIG. 1 and FIG. 4. Therein, the fastener 40 has a hook part 41 on one end and a pivot shaft 42 on another end thereof. The hook part 41 is used to engage with the second engagement part 31. The pivot shaft 42 is disposed on the first engagement part 12. Therefore, when the second box body 20 is at the closed position and the third body 30 is at the retracted position, the fastener 40 is engaged with the first engagement part 12 and the second engagement part 31, so that the toolbox 100 enters the closed status. In contrast, when the hook part 41 of the fastener 40 is separated from the second engagement part 31, the toolbox 100 is allowed to be opened; subsequently, the second box body 20 pivots to the expanded position, and the third box body 30 is slidingly pulled to the expanded position.

Figure 3:
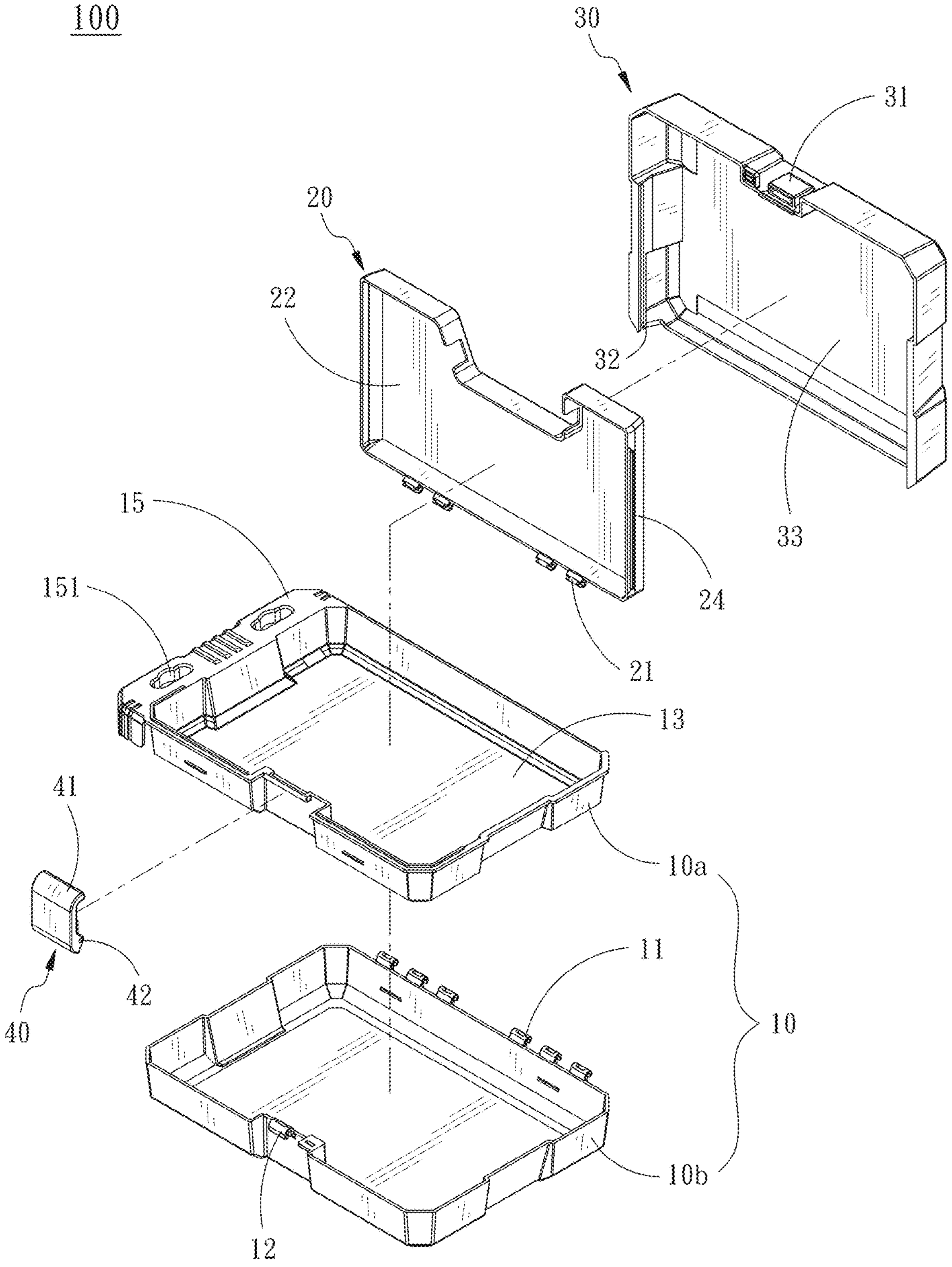
FIG. 3 is an exploded view of the expandable toolbox in accordance with an embodiment of the present invention.
Figure 7:
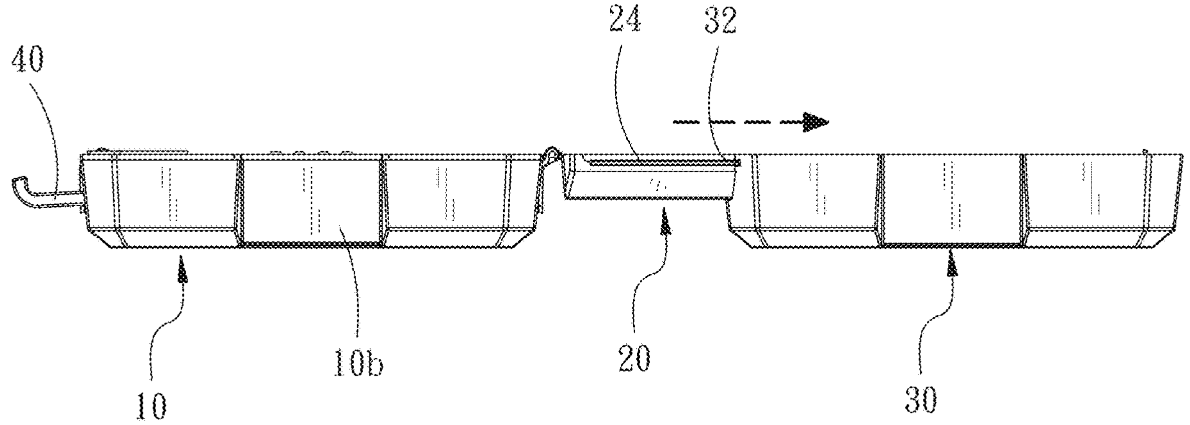
FIG. 7 is a side view of FIG. 6.

Referring to FIG. 3, FIG. 6, and FIG. 7, when the second box body 20 is at the expanded position, the second box body 20 and the first box body 10 are arranged in an open and flat shape, so that the third box body 30 is slidably pulled out with respect to the second box body 20, thereby increasing the usable space.

With the foregoing configuration, the toolbox 100 of the present invention is formed of three box bodies that are pivotably and slidably arranged with respect to each other, so that the toolbox is freely transformed between the closed and expanded status, thereby increasing the usable space and improving the utility and flexibility of the toolbox 100.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An expandable toolbox, comprising:

a first box body comprising a first pivot part and a first engagement part arranged away from the first pivot part;

a second box body comprising a second pivot part pivotally disposed on the first pivot part along an axis, so that the second box body pivots between a closed position and an expanded position with respect to the first box body; when the second box body is at the expanded position, the second box body and the first box body are arranged in an open and flat shape; the second box body further comprising a first sliding part disposed on two sides thereof;

a third box body comprising a second engagement part and a second sliding part, the second sliding part slidably disposed on the first sliding part, so that the third box body slides between a retracted position and an expanded position with respect to the second box body; and a fastener configured such that, when the second box body is in the closed position and the third box body is in the retracted position, the fastener is engaged with the first engagement part and the second engagement part to retain the third box body relative to the first box body, wherein the first box body and the third box body cooperatively define an outer enclosure of the expandable toolbox, and wherein the second box body is enclosed within the outer enclosure.

2. The expandable toolbox of claim 1, wherein when the third box body is at the expanded position, the third box body is slidably pulled out along a direction perpendicular to the axis with respect to the second box body.

3. The expandable toolbox of claim 2, wherein the first box body comprises a first placement face, the second box body comprises a second placement face, and the third box body comprises a third placement face; the second placement face and the third placement face are not arranged on a same plane; at the closed position and the retracted position, both the second placement face and the third placement face are arranged to face the first placement face; at the expanded position, the second placement face is partially overlapped with the third placement face.

4. The expandable toolbox of claim 3, wherein the first box body has a first height, the second box body has a second height, and the third box body has a third height; the first height is identical to the third height, and the second height is less than the third height; an inner space is formed between the second box body and the third box body.

5. The expandable toolbox of claim 4, wherein the first box body comprises an inner casing and an outer casing that are sleeved together; the first placement face is disposed on the inner casing; the first pivot part and the first engagement part are disposed on the outer casing.

6. The expandable toolbox of claim 5, wherein the inner casing comprises a handle disposed on one side thereof; the handle comprises a hanger bore.

7. The expandable toolbox of claim 5, wherein the fastener has a hook part on one end and a pivot shaft on another end thereof; the hook part is engaged with the second engagement part; the pivot shaft is disposed on the first engagement part.

8. The expandable toolbox of claim 3, wherein the first sliding part includes two sliding blocks; the second sliding part includes two sliding grooves; the two sliding grooves are disposed on two opposite inner sides of the third box body corresponding to the two sliding blocks.

9. The expandable toolbox of claim 8, wherein the two sliding blocks and the two sliding grooves are formed in a long shape.

10. The expandable toolbox of claim 2, wherein the third box body is allowed to be completely pulled out with respect to the second box body and detached from the second box body.

* * * * *